(12) United States Patent
Phillips et al.

(10) Patent No.: US 8,572,488 B2
(45) Date of Patent: Oct. 29, 2013

(54) SPOT DIALOG EDITOR

(75) Inventors: Michael E. Phillips, Melrose, MA (US); Glenn Lea, Marblehead, MA (US)

(73) Assignee: Avid Technology, Inc., Burlington, MA (US)

( * ) Notice: Subject to any disclaimer, the term of this patent is extended or adjusted under 35 U.S.C. 154(b) by 586 days.

(21) Appl. No.: 12/748,695

(22) Filed: Mar. 29, 2010

(65) Prior Publication Data

US 2011/0239119 A1 Sep. 29, 2011

(51) Int. Cl.
*G06F 3/00* (2006.01)
*G06F 3/048* (2013.01)

(52) U.S. Cl.
USPC ........... 715/716; 715/230; 715/232; 715/233; 715/254; 715/717; 715/718; 715/719; 715/720; 715/727; 715/731; 715/704

(58) Field of Classification Search
USPC ......... 715/731, 230, 232–233, 254, 716–720, 715/727
See application file for complete search history.

(56) References Cited

U.S. PATENT DOCUMENTS

| | | | | |
|---|---|---|---|---|
| 5,737,725 A * | 4/1998 | Case | ............................ | 704/260 |
| 5,781,687 A * | 7/1998 | Parks | ............................ | 386/281 |
| 5,799,273 A * | 8/1998 | Mitchell et al. | ............... | 704/235 |
| 5,822,405 A * | 10/1998 | Astarabadi | ................. | 379/88.04 |
| 6,023,675 A * | 2/2000 | Bennett et al. | ................ | 704/235 |
| 6,026,409 A * | 2/2000 | Blumenthal | .......................... | 1/1 |
| 6,076,059 A * | 6/2000 | Glickman et al. | ............ | 704/260 |
| 6,195,637 B1 * | 2/2001 | Ballard et al. | ................ | 704/235 |
| 6,332,147 B1 * | 12/2001 | Moran et al. | ................... | 715/203 |
| 6,366,296 B1 * | 4/2002 | Boreczky et al. | ............ | 715/719 |
| 6,457,031 B1 * | 9/2002 | Hanson | .......................... | 715/234 |
| 6,473,778 B1 * | 10/2002 | Gibbon | ......................... | 715/201 |
| 6,544,294 B1 * | 4/2003 | Greenfield et al. | ........... | 715/234 |
| 6,581,070 B1 * | 6/2003 | Gibbon et al. | ........................ | 1/1 |
| 6,636,238 B1 * | 10/2003 | Amir et al. | ..................... | 715/730 |
| 6,721,703 B2 * | 4/2004 | Jackson et al. | ................ | 704/270 |
| 6,728,682 B2 * | 4/2004 | Fasciano | ....................... | 704/278 |
| 6,760,700 B2 * | 7/2004 | Lewis et al. | ................... | 704/235 |
| 6,789,228 B1 * | 9/2004 | Merril et al. | .................. | 715/243 |
| 6,912,498 B2 * | 6/2005 | Stevens et al. | ................. | 704/235 |
| 6,961,954 B1 * | 11/2005 | Maybury et al. | ................. | 725/53 |
| 7,016,844 B2 * | 3/2006 | Othmer et al. | ............. | 704/270.1 |
| 7,047,191 B2 * | 5/2006 | Lange et al. | ................... | 704/235 |
| 7,191,117 B2 * | 3/2007 | Kirby et al. | ....................... | 704/9 |
| 7,206,303 B2 * | 4/2007 | Karas et al. | .................... | 370/350 |
| 7,231,351 B1 * | 6/2007 | Griggs | .......................... | 704/251 |
| 7,324,939 B1 * | 1/2008 | Cardillo et al. | ............... | 704/236 |
| 7,343,082 B2 * | 3/2008 | Cote et al. | ..................... | 386/285 |
| 7,376,560 B2 * | 5/2008 | Bartosik et al. | ............... | 704/235 |
| 7,386,542 B2 * | 6/2008 | Maybury et al. | .............. | 707/733 |
| 7,487,086 B2 * | 2/2009 | Griggs | .......................... | 704/235 |
| 7,495,795 B2 * | 2/2009 | Graham et al. | .............. | 358/1.18 |
| 7,672,830 B2 * | 3/2010 | Goutte et al. | ..................... | 704/2 |

(Continued)

*Primary Examiner* — Steven B Theriault
(74) *Attorney, Agent, or Firm* — Oliver Strimpel

(57) ABSTRACT

Automated methods are used to augment an original script of a time-based media program that contains speech with timing metadata and an indication of a confidence level with which script portions are matched with the speech in the program audio track. An editor uses a spot dialog editor tool to produce a word-accurate spot dialog master by reviewing and editing script portions displayed next to the corresponding portions of the time-based media. The spot dialog editor tool selects for review and editing the parts of the script having a low confidence match with the speech in the program.

17 Claims, 6 Drawing Sheets

(56) References Cited

U.S. PATENT DOCUMENTS

| | | | |
|---|---|---|---|
| 7,743,347 B2* | 6/2010 | Graham et al. | 715/863 |
| 7,751,688 B2* | 7/2010 | Seo et al. | 386/241 |
| 7,836,389 B2* | 11/2010 | Howard et al. | 715/202 |
| 7,844,464 B2* | 11/2010 | Schubert et al. | 704/270.1 |
| 7,869,996 B2* | 1/2011 | Carraux et al. | 704/235 |
| 7,870,488 B2* | 1/2011 | Kirkpatrick | 715/720 |
| 8,028,248 B1* | 9/2011 | Zimmerman | 715/827 |
| 8,060,906 B2* | 11/2011 | Begeja et al. | 725/46 |
| 8,117,206 B2* | 2/2012 | Sibley et al. | 707/746 |
| 8,121,432 B2* | 2/2012 | Dorai et al. | 382/276 |
| 8,131,545 B1* | 3/2012 | Moreno et al. | 704/235 |
| 8,132,103 B1* | 3/2012 | Chowdhury et al. | 715/723 |
| 8,140,341 B2* | 3/2012 | Faisman et al. | 704/277 |
| 8,196,045 B2* | 6/2012 | Chandratillake et al. | 715/719 |
| 8,300,776 B2* | 10/2012 | Davies et al. | 379/88.11 |
| 2001/0047266 A1* | 11/2001 | Fasciano | 704/278 |
| 2002/0161579 A1* | 10/2002 | Saindon et al. | 704/235 |
| 2003/0004724 A1* | 1/2003 | Kahn et al. | 704/260 |
| 2003/0078973 A1* | 4/2003 | Przekop et al. | 709/204 |
| 2003/0083885 A1* | 5/2003 | Frimpong-Ansah | 704/277 |
| 2003/0107592 A1* | 6/2003 | Li et al. | 345/745 |
| 2003/0163815 A1* | 8/2003 | Begeja et al. | 725/46 |
| 2003/0208626 A1* | 11/2003 | Gibbon et al. | 709/247 |
| 2004/0025180 A1* | 2/2004 | Begeja et al. | 725/46 |
| 2004/0090462 A1* | 5/2004 | Graham | 345/767 |
| 2004/0098671 A1* | 5/2004 | Graham et al. | 715/527 |
| 2004/0103372 A1* | 5/2004 | Graham | 715/513 |
| 2004/0152055 A1* | 8/2004 | Gliessner et al. | 434/169 |
| 2004/0175036 A1* | 9/2004 | Graham | 382/173 |
| 2005/0228663 A1* | 10/2005 | Boman et al. | 704/235 |
| 2006/0047701 A1* | 3/2006 | Maybury et al. | 707/104.1 |
| 2006/0149781 A1* | 7/2006 | Blankinship | 707/103 R |
| 2006/0179403 A1* | 8/2006 | Kirkpatrick | 715/501.1 |
| 2006/0183089 A1* | 8/2006 | Gleissner et al. | 434/157 |
| 2006/0206526 A1* | 9/2006 | Sitomer | 707/104.1 |
| 2007/0050844 A1* | 3/2007 | Lebel | 726/13 |
| 2007/0061728 A1* | 3/2007 | Sitomer et al. | 715/723 |
| 2007/0074116 A1* | 3/2007 | Thomas | 715/719 |
| 2007/0172799 A1* | 7/2007 | Aubert | 434/157 |
| 2007/0185857 A1* | 8/2007 | Kienzle et al. | 707/5 |
| 2007/0192107 A1* | 8/2007 | Sitomer et al. | 704/270 |
| 2007/0244902 A1* | 10/2007 | Seide et al. | 707/10 |
| 2007/0255565 A1* | 11/2007 | Yu et al. | 704/251 |
| 2007/0286032 A1* | 12/2007 | Townsend et al. | 369/27.01 |
| 2008/0177623 A1* | 7/2008 | Fritsch et al. | 705/11 |
| 2008/0319744 A1* | 12/2008 | Goldberg | 704/235 |
| 2009/0037171 A1* | 2/2009 | McFarland et al. | 704/235 |
| 2009/0083256 A1* | 3/2009 | Thompson et al. | 707/5 |
| 2009/0158157 A1* | 6/2009 | Shields et al. | 715/723 |
| 2009/0228274 A1* | 9/2009 | Terrell et al. | 704/235 |
| 2009/0319516 A1* | 12/2009 | Igelman et al. | 707/5 |
| 2010/0014828 A1* | 1/2010 | Sandstrom et al. | 386/69 |
| 2010/0091182 A1* | 4/2010 | Gibbon et al. | 348/441 |
| 2010/0122285 A1* | 5/2010 | Begeja et al. | 725/34 |
| 2010/0180218 A1* | 7/2010 | Boston et al. | 715/759 |
| 2010/0268534 A1* | 10/2010 | Thambiratnam et al. | 704/235 |
| 2010/0299131 A1* | 11/2010 | Lanham et al. | 704/2 |
| 2010/0332225 A1* | 12/2010 | Arrowood et al. | 704/235 |
| 2011/0060751 A1* | 3/2011 | English et al. | 707/758 |
| 2011/0113357 A1* | 5/2011 | Rosu et al. | 715/764 |
| 2011/0145428 A1* | 6/2011 | Wei et al. | 709/231 |
| 2012/0047437 A1* | 2/2012 | Chan | 715/720 |
| 2012/0150907 A1* | 6/2012 | Chowdhury et al. | 707/769 |

* cited by examiner

FIG. 4

SIMPLE SIMON:      01:00:00:01 01:00:01:14 "Nice place, isn't it?"
JACK SPRAT:   01:00:02:06 01:00:04:07 it's alright. I've seen better.
SIMPLE SIMON  01:00:04:21 01:00:07:03 Well I hear the steaks are really lean.
JACK SPRAT:  01:00:07:17: 01:00:10:18 They better be good or you'll be sorry.

FIG. 5

| | |
|---|---|
| Speaker | SIMPLE SIMON |
| Timecode | 01:00:00:01  01:00:01:14 |
| English | Nice place, isn't it? |
| French | Endroit agreable, n'est-ce pas? |
| German | Angenehmen Platz, nicht wahr? |
| Italian | Bel posto, non e vero? |

| | |
|---|---|
| Speaker | JACK SPRAT |
| Timecode | 01:00:02:06  01:00:04:07 |
| English | It's alright. I've seen better. |
| French | C'est bon, j'ai vu mieux. |
| German | Es ist Ordnung, ich habe eine bessere gesehen. |
| Italian | E tutto a posto, ho visto meglio. |

| | |
|---|---|
| Speaker | SIMPLE SIMON |
| Timecode | 01:00:04:21  01:00:07:03 |
| English | Well, I hear the steaks are really lean. |
| French | Eh bien, j'entends les steaks sont vraiment maigre. |
| German | Nun, ich höre die Steaks sind sehr mager. |
| Italian | Beh, ho sentito le bistecche sono davvero magra. |

| | |
|---|---|
| Speaker | JACK SPRAT |
| Timecode | 01:00:07:17  01:00:10:18 |
| English | They better be or you'll be sorry. |
| French | Ils sont mieux de ou tu vas etre desole. |
| German | Sie besser oder es Ihnen leid tun. |
| Italian | Essi sono meglio essere o te ne pentirai. |

FIG. 6

SPOT DIALOG EDITOR

RELATED APPLICATIONS

This application is related to U.S. patent application Ser. No. 12/748,570, entitled "Transcript Editor" filed on even date herewith, which is wholly incorporated herein by reference.

BACKGROUND

The generation of an accurate transcript of a finished, edited dialog-intensive media program is currently a labor-intensive process. Even if a script is available to serve as a starting point, it will generally not conform accurately to what is said in the post-edit, finished program owing to improvised departures from the script and material that has been cut and reordered during editing. Keying a transcript to the times when the corresponding audio dialog occurs in the media requires a human transcriber to play back the edited media, transcribe the dialog, noting the start times for each phrase or sentence, and identifying the character that is speaking. For an average feature-length film, this process takes about 5-10 days. Such an annotated transcript, often referred to as a spot dialog master, has a number of uses in the program distribution workflow. For example, it serves as the primary document that drives dubbing and subtitling for domestic and foreign distribution. It also serves to indicate spans of the various sources that are utilized in the final program, which need to be compiled for reporting purposes in connection with broadcasting rights, clearance, payment of fees, and music rights. The increasing complexity of program production, and the need to move rapidly through the production workflow place a premium on efficiency and speed in the process of generating a transcript and a spot dialog master. There is also an increasing need to track and retain more metadata associated with the various stages of program production and distribution. Furthermore, for time-sensitive productions that have required delivery dates around the world, it is desirable both to speed up the editing process, and to reduce or eliminate the time taken to produce the spot dialog master.

SUMMARY

The methods, systems, and computer program products described herein involve a semi-automatic technique for generating a spot dialog master for time-based media programs, such as video programs with synchronized audio, or audio only programs, and for generating other production-related reports for time-based media.

In general, in one aspect, in a computer-based system, a method of conforming a script or transcript comprising words and phrases corresponding to a time-based media program that includes recorded speech includes: receiving the script or transcript, wherein the script or transcript includes timing information that, for each of a plurality of words or phrases within the script or transcript, associates that word or phrase with a temporal location within the time-based media program where that word or phrase has been matched with a corresponding spoken word or phrase in the recorded speech, and a confidence level for that match; displaying a selected portion of the script or transcript, wherein at least one of the words or phrases within the selected portion has a confidence level equal to or lower than a predetermined threshold confidence level; retrieving a portion of the time-based media program corresponding to the temporal location; playing back the retrieved portion of the time-based media program to enable a user to compare the retrieved portion of the time-based media program and the selected portion of the script or transcript; and editing the selected portion of the script or transcript in response to input received from the user.

Various embodiments include one or more of the following features. The time-based media includes a video component synchronized with the recorded speech. The time-based media is an audio-only program. The script or transcript includes metadata associated with the time-based media program in addition to the timing information. The method further involves outputting a spot dialog master corresponding to the time-based media program, wherein the spot dialog master includes the edited script or transcript, for each word or phrase in the edited script or transcript a name of a character speaking that word or phrase in the time-based media program, and the timing information. The spot dialog master is represented as an XML document. In addition, the method involves generating from the spot dialog master a selected character dialog master that includes only the edited script or transcript of words or phrases spoken by the selected character, and their associated timing information.

In general, in another aspect, in a computer-based system, a method of conforming a transcript comprising words and phrases of dialog to a dialog audio track of a time-based media program includes: receiving an augmented version of the transcript and, for each of a plurality of the words and phrases within the transcript, timing information identifying a temporal location within the time-based media program where each of the plurality of words or phrases is spoken in the dialog audio track, the timing information being associated with a confidence level based on a quality of match between each of the words or phrases and their corresponding identified temporal location within the time-based media; receiving the time-based media program; and providing an interactive graphical interface for a user, the graphical interface including a transcript display portion for displaying text from the transcript and a media display portion for displaying a portion of the time-based media program spanning the identified temporal location corresponding to the displayed text from the transcript; displaying text from the transcript in the transcript display portion, wherein the text from the transcript is displayed with a visual attribute corresponding to its associated confidence level; in response to a request from the user, playing the portion of the time-based media in the media display portion; and enabling the user to edit the displayed text from the transcript in the transcript display portion. In some embodiments, the time-based media includes a video component, and the video component is synchronized to the dialog audio track.

In general, in yet another aspect, in a computer-based system, a method of generating a spot dialog master for a foreign language version of a time-based media program, the method includes: receiving the foreign language dubbed version of the time-based media program; receiving a transcript for a domestic version of the time-based media program, wherein the transcript includes timing information that, for each of a plurality of words or phrases within the transcript, associates that word or phrase with a temporal location within the domestic version of the time-based media program where that word or phrase has been matched with a corresponding spoken word or phrase in a dialog audio track of the domestic version of the time-based media program; displaying a selected portion of the transcript; in response to a user command, using the timing information to select and play back a portion of the foreign language version of the time-based media program that spans the temporal location; and enabling a user to enter a foreign langue translation of the selected portion of the transcript based on the selected portion of the transcript and the selected portion of the foreign language version of the time-based media program.

BRIEF DESCRIPTION OF THE DRAWINGS

FIG. 4 is an illustration of a user interface for a multilingual spot dialog editor.

FIG. 5 is shows sample output from the spot dialog editor for the script portion illustrated in FIG. 3.

FIG. 6 shows sample output from the multilingual spot dialog editor for the script portion illustrated in FIG. 4.

DETAILED DESCRIPTION

During the production phase of making a time-based media program containing dialog, such as a film, video, or audio program, the original media is captured either by shooting film or video (usually with synchronized audio), or, in the case of an audio only program, recording audio. In many cases, a script is prepared before production, and the production is based on the script. After the raw media is captured, a transcript of the media is generated. This is usually prepared by hand in a laborious process in which a transcriber plays back the media, notes the timecode or frame count, and types out the text he or she hears. The post production editor then creates the final program by selecting the portions of interest, cutting those parts to be omitted, and reordering the media into the final sequence. For a dialog-intensive program, rough editing can be accelerated using a time-indexed augmented transcript and the transcript editor, described in related U.S. patent application Ser. No. 12/748,570, entitled "Transcript Editor." When editing is complete, it is necessary to create a spot dialog master, which includes at a minimum a word-accurate transcript of the speech included in the final edited program, together with who is saying the speech, and where in the final program the dialog occurs. Current methods for generating the spot dialog master are labor-intensive, even if the bulk of the text is already available for reference in the form of the transcript of the original media.

Traditionally, after completion of post-production editing, the spot dialog master is generated by painstaking manual viewing and listening, recording of the frame count or timing of each piece of dialog, and marrying what is said with the name of the character who is speaking. In addition, for video, the titles, credits, and any signs are identified and timed. For a typical feature length film, the process takes 5-10 days to complete. In the described embodiment, the audio processing techniques for time-aligning a transcript with the dialog audio track from the finished program (described below) permits the fully automatic generation of a first draft of the spot dialog master, as described below. A spot dialog editing tool and interface then facilitates rapid final editing of the script, and automatically adds the timing and the name of the speaker, as well as other relevant metadata from the program master. This reduces the time to create the final spot dialog master of a typical feature-length film to about one day. Although the term "spot dialog master" generally corresponds to a final version of a video program or a film, the methods and systems described herein are also applicable to audio only programs, such as radio programs.

Figure 1:
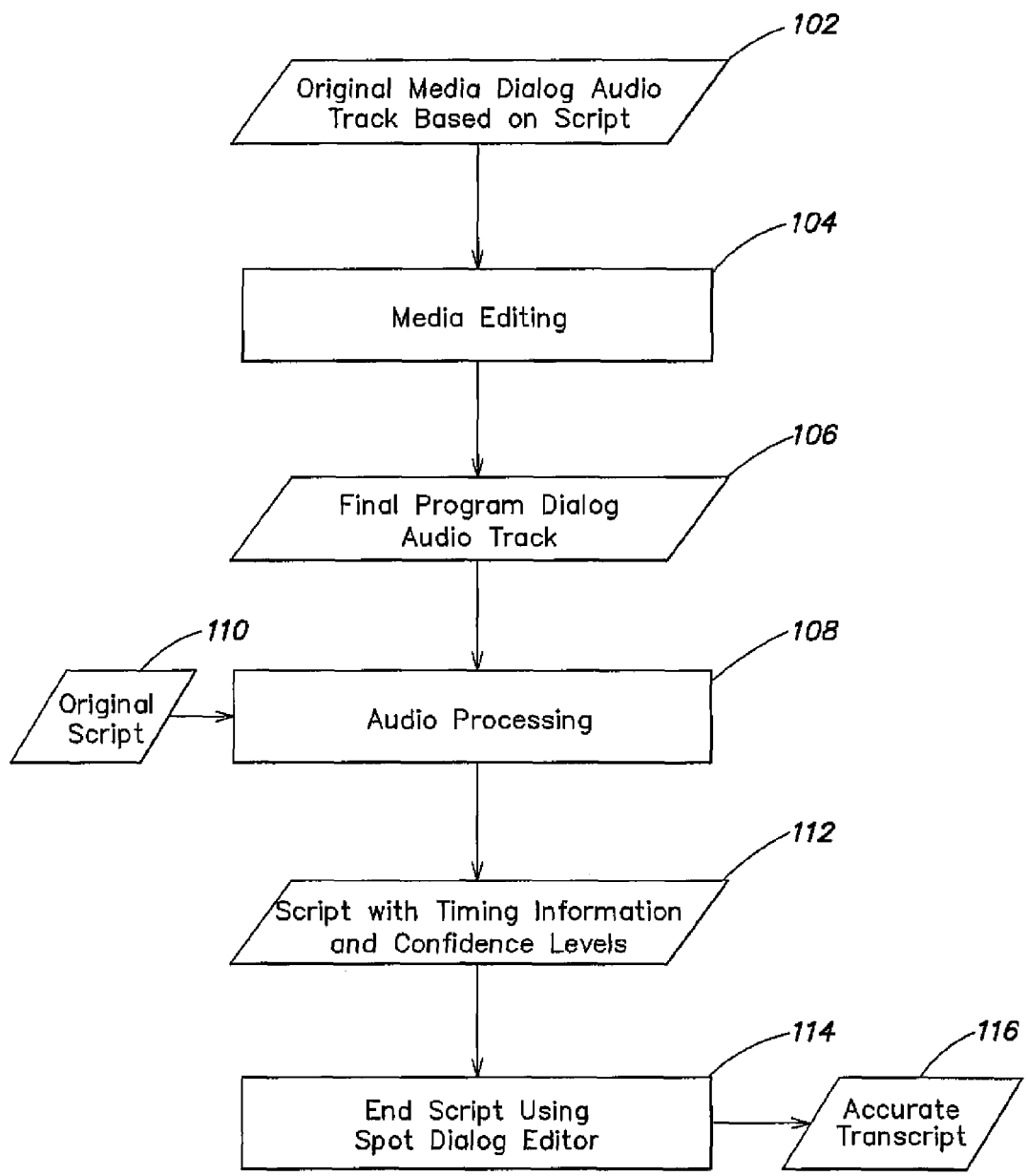
FIG. 1 is a flow diagram for generating an accurate transcript using a spot dialog editor.

The method uses as inputs the original captured time-based media (video and audio, or audio only), a script or transcript, and the dialog audio track of the final program media after completion of the editing. The methods described herein can use as text input any textual script corresponding to the time-based media for which a spot dialog master is being created, whether it is a pre-production script, a transcript of a non-final version of the media, or a transcript of the version of the media that is used to edit together the final program. Referring to FIG. 1, the original media dialog audio track (102) incorporates spoken dialog that is based on a script. In a typical shooting sequence, multiple takes are shot, and the actors sometimes ad-lib, thus adding dialog that has no counterpart in the script, or drop lines that were present in the script, or cause parts of the script to change places. Such script departures introduce a first source of inconsistency between the text corresponding to a final program and the original script. A transcript may be created at this stage. In the described embodiment, either a script, or a transcript if one is available, may be used throughout. Generally, it is preferable to work with a transcript since it reflects the original media more accurately than the script.

In the post-production phase, media editing 104 results in possible reordering and elimination of portions of the media that include dialog, or the introduction of additional media, thus introducing a second source of variation between the original script and the dialog corresponding to the final program. Final program dialog audio track 106 is now passed through a time alignment process, such as one involving synchronization of a phonetically indexed dialog audio track of the media with a script or transcript. In the described embodiment, audio processing step (108) identifies phonemes in the edited media. The phoneme sequences are matched up, where found, with phonemes that correspond to the original script or a transcript 110, each match being assigned a confidence level based on the quality of the match. The confidence level assigned to each word or phrase of the script or transcript reflects a degree of confidence that the word or phrase has been correctly identified in the dialog audio track of the media, and that there are no discrepancies between the word or phrase from the script or transcript and the audio speech identified in the media. Timing information from final program dialog audio track 106 is added at the points in the script or transcript for which phoneme matching is available. The timing information may be added at a syllable, word, phrase, sentence, or even at a paragraph level of granularity, depending on the level of accuracy desired in the dialog master. The result of audio processing step 108 is the script or transcript, augmented with word or phrase-accurate timing information and the corresponding confidence levels associated with the match between the audio and script or transcript for each of the words or phrases (112). A technique for time-alignment of a transcript with a dialog audio track using phoneme matching is provided by as Nexidia Inc. of Atlanta Ga., and is described in U.S. Pat. Nos. 7,231,351, and 7,263,484, which are wholly incorporated herein by reference.

A spot dialog editor is used to facilitate the review and editing of those portions of the script or transcript for which the alignment process yielded mid-level or low confidence scores. The spot dialog editor program finds corresponding portions of the edited media using the timing information and presents them to the operator on demand. The operator reviews (step 114) such portions and edits the text entries as needed to convert the script into a final, word-accurate transcript (116) that is used for the spot dialog master, and that corresponds accurately to the final edited media.

Figure 2:
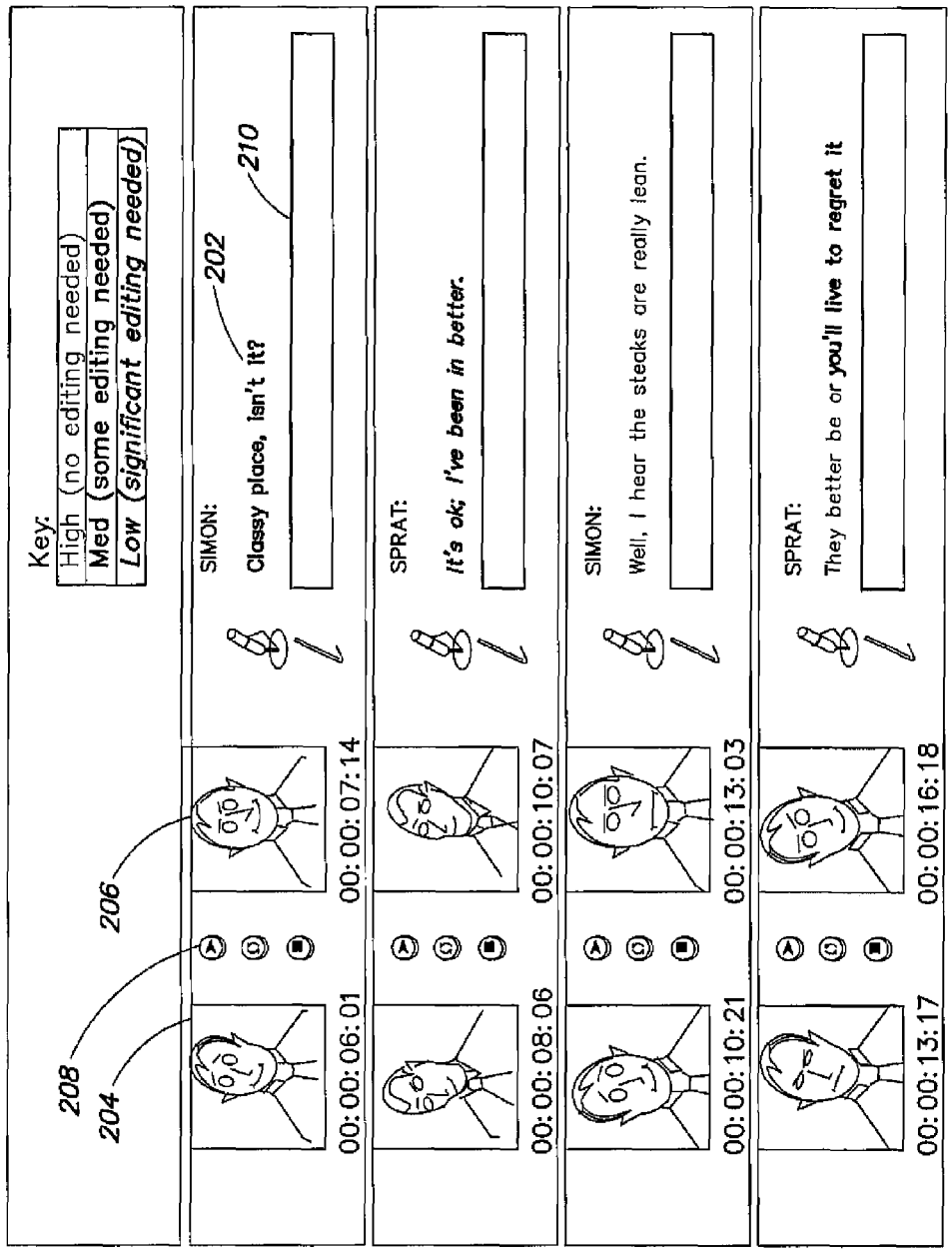
FIG. 2 is an illustration of a user interface for a spot dialog editor.

FIG. 2 is a schematic representation of a user interface for the spot dialog editor. On the right hand side of the display, text selected from the script for review is displayed, and media corresponding to the start and end points of the text is displayed nearby. For example, the first text phrase for editing "Classy place, isn't it?" (202) is displayed next to start frame of the dialog (FIG. 2, ref. 204) and end frame (FIG. 2, ref. 206) from the clip in which the text appears in the dialog. Note, the selected media portion corresponds only to the media that includes the spoken dialog being edited, and not to the edit points of the shot (picture). The spot dialog editor uses the timing augmented script (FIG. 1, 112) to retrieve the media that corresponds to the text. The spot dialog editor also provides a visual indication of the confidence level with which the audio processing has matched the text to dialog in the media. In the illustrated embodiment, the confidence of the match is binned into three levels—high, medium, and low, and conveyed in the displayed text using standard, bold, and bold italic fonts respectively. In some embodiments the confidence level is indicated by font color, or by a confidence level indicator icon. The user can then listen to the clip by clicking on play icon 208 (which can also include a loop play option), and, if changes are needed, enter the corrected text in the box provided (210).

Figure 3:
FIG. 3 is an illustration of a user interface for a spot dialog editor showing edits.

FIG. 3 shows the manual edits performed by the user after listening to the corresponding media. Three of the displayed phrases, 302, 304, and 308, required correction, while the fourth 306, which was matched with high confidence, required no changes. The spot dialog editor can be adjusted to limit the display of script text having a match confidence level below a certain threshold, with the threshold being adjustable by the user. In some embodiments, the spot dialog editor defaults to a mid-level confidence value for the threshold that has been empirically determined to cause the spot dialog editor to display only the script portions that depart enough from the final media program to require an edit. This can correspond to any discrepancy, even a very minor one, that may require a script change, no matter how small.

For example, in the embodiment shown in FIGS. 2 and 3, in which confidence levels are binned into one of three levels, the user could elect not to view text matched to the media with high confidence, and limit the script checking and editing to text that has been matched with medium or low confidence. If the matching process has been performed largely with high confidence, such a selective display of script text can greatly reduce the amount of the script that needs to be reviewed, helping to focus the user's attention on those text portions that have a high probability of needing correction.

Figure 4:
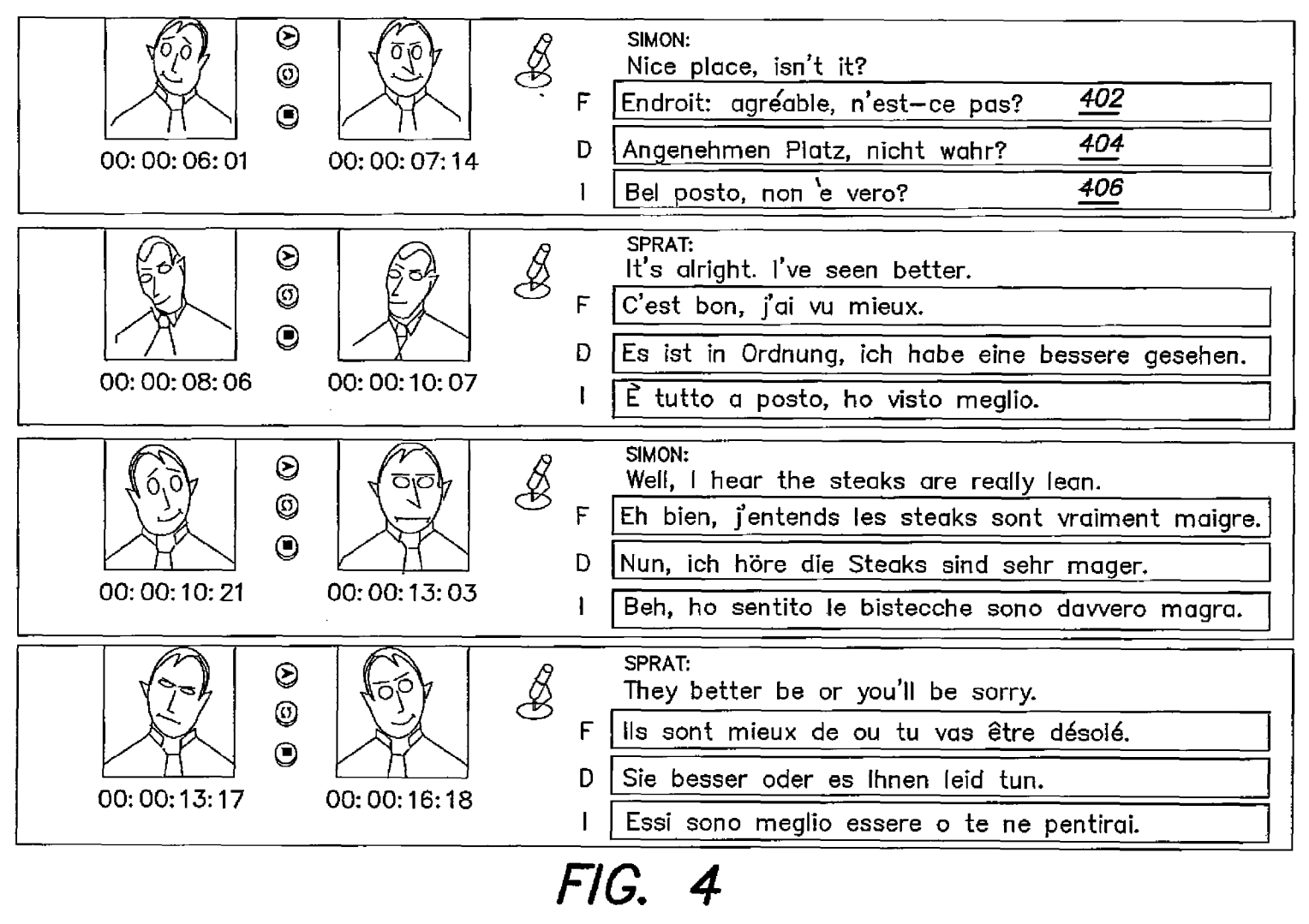

The spot dialog editor also provides enhanced efficiency in producing accurate foreign language translations of the domestic version spot dialog master. Translators tasked with generating the foreign language spot dialog master are guided by the spot dialog editor to the locations in the media corresponding to the portion of the domestic dialog being translated, in a similar fashion to that described above for generating an English language domestic spot dialog master. This provides efficient access to both transcript and media of the domestic version, enabling translators to use subtleties of the speech and context to generate accurate translations incorporating appropriate local usage, slang, idioms, and other expressions. FIG. 4 shows a user interface for entering translations in French, German, and Italian that conform to the corresponding media. In the illustrated user interface, separate boxes 402, 404, and 406 are provided for a user to enter the spoken word translations for French, German, and Italian respectively. In major film productions, approximately eight foreign language dubbed versions are produced. In some embodiments, a foreign language user interface facilitates entry of a single foreign language by providing a text entry region displayed in association with the corresponding domestic transcript and domestic media program portion containing the dialog.

Once the user has completed the script edits, the system outputs the word accurate transcript stamped with the corresponding timing information and the name of the person speaking the dialog, i.e., the spot dialog master. In the described embodiment, the spot dialog editor outputs an XML document, in which timing information is obtained from the phoneme-based indexing of the media dialog audio track matched with the phonemes derived from the transcript, the character is obtained from a character tag placed in the XML document, and location and scene information are obtained if desired from their corresponding tagged entries. An example of a tagging scheme for entering character, scene, location, and other information is used by the script entry product Final Draft (version 8 or later) available from Final Draft, Inc., Calabasos, Calif. A sample portion of the spot dialog master output by the spot dialog editor that corresponds to the text displayed in FIG. 3 is shown in FIG. 5, and the output corresponding to the four languages illustrated in FIG. 4 is shown in FIG. 6.

The rapid and semi-automatic generation of an original dialog master list using audio indexing methods also enables the automation and streamlining of various processes and deliverables further downstream in the media creation and distribution process. This is facilitated by including additional metadata into an augmented dialog master document. Such metadata can include video related information including, but not limited to, frame rate, shoot date, camera roll, scene, take, sound roll, production timecode, HD tape name and timecode, SD tapename and sound code, pulldown, KeyKode®, pan and scan parameters, character identification, and user-defined metadata such as comments and descriptions. Some of the metadata is native to the media essence file, such as timecode and KeyKode®, while other metadata is added at various stages during the media workflow by production staff, such as camera roll, slate, take, and comments, or by editors (such as review and approval entries) or by the media asset management (MAM) system. During the audio processing, indexing, and alignment of the transcript with the media, some or all of the additional metadata can be inserted into the augmented transcript with an accuracy down to an individual frame.

Music associated with a program often requires special permissions and licensing. The augmented dialog master described above facilitates the automatic reporting of the locations and durations within a film or television program of music, and the identity of the music, such as, for example, the name of a song and the portion of the song used within the program. Such data is automatically compiled into reports that are generated for licensing of the music from organizations such as ASCAP. Similar reporting is also required for distribution of audio only programs, such as radio documentaries or dramas.

The dialog and associated timing information in the augmented dialog master also facilitates generation of foreign language versions of a film or television program. For example, all the text spoken by a particular character is extracted from the augmented dialog master to generate lines for dubbing by actors; the associated timing information automatically keys the lines to the corresponding media so that dubbing actors can synchronize their speech to the portions being dubbed while watching the video for context.

Video, audio, and the script corresponding to domestic and foreign language versions can be exported to automated dialog replacement systems.

The augmented dialog master, complete with metadata from all stages of the media workflow has a number of additional uses. For example, it can serve as a basis for generating closed captions or subtitles for foreign country versions. Metadata that indicates where edits and transitions occur can be used to ensure that subtitles are broken up so as not to span edits (cut points), or to implement subtitling rules, such as limiting the number of characters per line and the number of lines in a given subtitle. Reports can also be generated from the metadata defining titles and credits for creating foreign language translations. In various embodiments, an augmented dialog generates a range of other reports, including but not limited to reports regarding digital rights relating to usage type, and geographic or temporal usage restrictions.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), stereoscopic displays and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. In a computer-based system, a method of conforming a script or transcript comprising words and phrases corresponding to a time-based media program that includes recorded speech, the method comprising:
    receiving the script or transcript;
    receiving timing information comprising, for each of a plurality of words or phrases within the script or transcript, a temporal location within the time-based media program where that word or phrase has been matched with a corresponding spoken word or phrase recognized in the recorded speech, and a confidence level for a match of the word or phrase from the selected portion of the script or transcript to the word or phrase recognized in the recorded speech;
    displaying a selected portion of the script or transcript;
    using the timing information, displaying, along with the word or phrases of the displayed selected portion of the script or transcript to which the confidence level corresponds, a graphical representation of the confidence levels for the matches of the words or phrases from the displayed selected portion of the script or transcript to the corresponding words or phrases recognized in the recorded speech from the temporal location within the time-based media program according to the received timing information, wherein at least one of the words or phrases within the selected portion has a confidence level equal to or lower than a predetermined threshold confidence level indicating that said at least one of the words or phrases in the selected portion do not match the words or phrases recognized in the recorded speech;
    retrieving a portion of the time-based media program corresponding to the temporal location associated with the selected portion of the script or transcript;
    playing back the retrieved portion of the time-based media program, while the selected portion of the script or transcript and graphical representation of the corresponding confidence levels are displayed, to enable a user to compare the retrieved portion of the time-based media program and the selected portion of the script or transcript; and
    in response to input received from the user, making corrections as indicated by the user to the text of the selected portion of the script or transcript so as to have the corrected text match the words or phrases in the recorded speech, such corrections being made while text from the selected portion of the script or transcript and corresponding graphical representations of the confidence levels are displayed and the corresponding portion of the time-based media is played back.

2. The method of claim 1, wherein the time-based media includes a video component synchronized with the recorded speech.

3. The method of claim 1, wherein the time-based media is an audio-only program.

4. The method of claim 1, wherein the script or transcript includes metadata associated with the time-based media program in addition to the timing information.

5. The method of claim 1, the method further comprising outputting a spot dialog master corresponding to the time-based media program, wherein the spot dialog master includes:
the edited script or transcript;
for each word or phrase in the edited script or transcript, a name of a character speaking that word or phrase in the time-based media program; and
the timing information.

6. The method of claim 5, wherein the spot dialog master is represented as an XML document.

7. The method of claim 5, further comprising generating from the spot dialog master a selected character dialog master that includes only words or phrases of the edited script or transcript spoken by the selected character, and timing information corresponding to the words of phrases spoken by the selected character.

8. The method of claim 1 wherein the graphical representation of the confidence level comprises an indication of an amount of editing to be done to words or phrases in the script or transcript.

9. The method of claim 1 wherein the graphical representation of the confidence level comprises a formatting applied to displayed text.

10. The method of claim 1 wherein the graphical representation of the confidence level includes an indication of high, medium and low confidence levels.

11. The method of claim 1 wherein the graphical representation of the confidence level includes a different formatting applied to text for each of high, medium and low confidence levels.

12. In a computer-based system, a method of conforming a transcript comprising words and phrases of dialog to a dialog audio track of a time-based media program, the method comprising:
receiving an augmented version of the transcript and, for each word or phrase of a plurality of the words and phrases within the transcript, timing information comprising a temporal location within the time-based media program where the word or phrase is spoken in the dialog audio track, and a confidence level indicating a quality of a match between each of the words or phrases from the transcript and words or phrases recognized in their corresponding identified temporal location within the time-based media;
receiving the time-based media program; and
providing an interactive graphical interface for a user, the graphical interface including a transcript display portion for displaying text from a portion of the transcript and a media display portion, simultaneously displayed with the transcript display portion, for displaying a portion of the time-based media program spanning the identified temporal location corresponding to the displayed text from the portion of the transcript according to the timing information;
displaying text from the portion of the transcript in the transcript display portion, wherein the text from the transcript is displayed with a visual attribute corresponding to the confidence levels for matches of the text from the portion of the transcript according to the timing information;
in response to a request from the user, playing the portion of the time-based media in the media display portion while the corresponding text and visual attribute corresponding to the confidence levels are displayed in the transcript display portion; and
enabling the user to make corrections to the displayed text from the transcript in the transcript display portion so as to have the text match the words or phrases spoken in the dialog audio track while the text from the portion of the transcript and the corresponding visual attribute corresponding to the corresponding confidence level are displayed and the corresponding portion of the time-based media is played.

13. The method of claim 12, wherein the time-based media includes a video component.

14. A computer program product, comprising:
a computer-readable medium; and
computer program instructions encoded on the computer-readable medium, wherein the computer program instructions, when processed by a computer, instruct the computer to perform a method for editing time-based media that includes recorded speech, the method comprising:
receiving the script or transcript;
receiving timing information comprising, for each of a plurality of words or phrases within the script or transcript, a temporal location within the time-based media program where that word or phrase has been matched with a corresponding spoken word or phrase recognized in the recorded speech, and a confidence level for a match of the word or phrase from the selected portion of the transcript to the spoken word or phrase recognized in the recorded speech from the associated temporal location within the time-based media program;
displaying a selected portion of the script or transcript;
using the timing information, displaying, along with the word or phrases of the displayed selected portion of the script or transcript to which the confidence level corresponds, a graphical representation of the confidence levels for the matches of the words or phrases from the displayed selected portion of the script or transcript to the corresponding words or phrases recognized in the recorded speech from the temporal location within the time-based media program according to the received timing information, wherein at least one of the words or phrases within the selected portion has a confidence level equal to or lower than a predetermined threshold confidence level, indicating that said at least one of the words or phrases in the selected portion do not match the words or phrases recognized in the recorded speech;
retrieving a portion of the time-based media program corresponding to the temporal location associated with the selected portion of the script or transcript;
playing back the retrieved portion of the time-based media program, while the selected portion of the script or transcript and graphical representation of the corresponding confidence levels are displayed, to enable a user to compare the retrieved portion of the time-based media program and the selected portion of the script or transcript; and
in response to input received from the user, making corrections as indicated by the user to the text of the selected portion of the script or transcript, so as to have the corrected text match the words or phrases in the recorded speech, such corrections being made while text from the selected portion of the script or transcript and corresponding graphical representations of the confidence levels are displayed and the corresponding portion of the time-based media is played back.

15. The computer program product of claim 14, wherein the time-based media includes a video component synchronized with the recorded speech.

16. The computer program product of claim 14, wherein the time-based media is an audio-only program.

17. The computer program product of claim 14, wherein the script or transcript includes metadata associated with the time-based media program in addition to the timing information.

* * * * *